United States Patent

[11] 3,607,745

| [72] | Inventor | Joseph DiPietro |
| | | Alma, Mich. |
| [21] | Appl. No. | 776,845 |
| [22] | Filed | Sept. 30, 1968 |
| [45] | Patented | Sept. 21, 1971 |
| [73] | Assignee | Michigan Chemical Corporation |
| | | Saint Louis, Mich. |

[54] AEROSOL FLAME RETARDANT COMPOSITIONS COMPRISING AN ALIPHATIC CHLOROFLUORO HYDROCARBON AND A FLAME RETARDANT
10 Claims, No Drawings

[52] U.S. Cl. .................................................. 252/8.1,
106/15, 117/136, 252/305
[51] Int. Cl. ...................................................... C09k 3/28,
C09k 3/30
[50] Field of Search............................................ 252/3, 8,
8.1, 7, 8.05, 2, 305; 106/15 FP; 117/136, 137;
161/403; 260/963

[56] References Cited
UNITED STATES PATENTS

| 2,021,981 | 11/1935 | Bichowsky | 252/8 X |
| 2,973,040 | 2/1961 | Covert | 169/31 |
| 3,046,297 | 7/1962 | Overbeek | 260/461 |
| 3,051,652 | 8/1962 | Olandt | 252/2 |
| 3,079,418 | 2/1963 | Pumpelly | 260/963 |
| 3,279,929 | 10/1966 | Peters | 106/18 |
| 3,425,939 | 2/1969 | Juillard | 252/7 |
| 3,449,475 | 6/1969 | Jenkner | 260/967 |
| 3,471,318 | 10/1969 | Redfarn | 117/136 |

OTHER REFERENCES

Aerosols: Science and Technology, H. R. Shepherd, editor, New York, 1961, pp. 17–19, 33–40, 215–216, and 523–524.

*Primary Examiner*—John T. Goolkasian
*Assistant Examiner*—D. J. Fritsch
*Attorney*—D. Cameron Pond

ABSTRACT: Aerosol solutions or emulsions useful in treating consumer's goods especially fabrics to render them fire-retardant are formulated for packaging under pressure in a valved container; and comprise a freon-type solvent, a brominated or chlorinated phosphate or phosphite such as tris (2,3-dibromopropyl) phosphate and, if desired, a carrier such as a polyvinyl chloride latex.

AEROSOL FLAME RETARDANT COMPOSITIONS COMPRISING AN ALIPHATIC CHLOROFLUORO HYDROCARBON AND A FLAME RETARDANT

The present invention relates to flame retardant sprayable aerosol compositions and to their use, when sprayed on normally flammable substances, to increase materially their resistance to burning.

The importance of imparting fire retardant characteristics to building materials, textiles, cellulosic materials and the like has long been recognized. Recently, however, the importance of imparting such characteristics has become still more important in view of legislation setting higher standards of fire retardation for many materials such as bedding, textiles and draperies. Over and above statutory standards or governmental regulations, many individuals are showing increased concern because of the relative flammability of textiles, and especially clothing.

By and large it is not practical, and it is often not possible to make flammable materials completely fire resistant, that is, self-extinguishing. However, it is very desirable to give such materials sufficient fire retardant properties to delay appreciably the spread of the flame. It is also very desirable to prevent what is commonly referred to as "afterglow," that is, to prevent the material from continuing to smolder or burn at a very slow rate till flame breads out again or of course, until the material is consumed or very nearly consumed.

Various procedures or methods have been employed to impart fire retardant characteristics to various normally flammable materials. One way of imparting fire retardant characteristics to building materials is to coat them with liquid solution containing a fire retardant material. Preferably the liquid will dry to a hard film, especially in the presence of moisture in the atmosphere. Impregnation of wood used in building materials has also been employed; for example, solutions of inorganic salts have been forced in the pores of the wood under pressure.

Textile materials, in order to be fire retardant, normally require the introduction of fire retardant material in the fiber itself; that is, the fiber from which the textile was produced has to be rendered flame retardant. Naturally such a procedure is possible only for synthetically produced fibers such as nylon, polyesters and the like. Of course, many textile materials and building materials contain large amounts of natural occurring fibers or cellulosic materials which are very flammable and they can not be treated in this way, such as cotton, hemp, jute and the like. Consequently, many materials formed from such natural occurring fibers and from synthetic fibers as well, are treated after the textiles are woven or produced. This procedure usually involves a dipping or an applying procedure such as knife coating, or the use of rollers which is often difficult to accomplish without adversely affecting the desirable physical properties of the materials such as hardness, hand, flexibility and color stability. Also, he introduction of fire retardant materials into the fiber or its application to the textile material itself is expensive.

Accordingly, it will be appreciated that a real need exists in many instances to increase the fire retardant properties of materials of construction after they have been used to make various consumer's goods such as wallboard, furniture, textiles and the like as well as for special purposes in potentially dangerous situations—Christmas trees for example. Not only are many such materials already in use in many instances without prior treatment to render then fire retardant; but often the fire retarding procedures mentioned above have not proved to be effective after the materials are treated in various ways, such as the incorporation of fillers, dyes and the like.

According to the present invention, the ultimate user of the materials of construction, such as for example, a housewife may treat various articles made from such materials to increase their fire resistant characteristics. In this way, the material in the most dangerous and exposed positions, such as wallboard near a fireplace, or children's clothing, may be treated without treating material in a location which may not require it. Also, such a method is convenient and can be repeated from time to time without excessive expense.

In addition the present invention provides compositions which are normally liquid and which when sprayed or applied to a flammable material of construction or other combustible substance imparts to it resistance to burning in terms of flame spread and the reduction of afterglow. As a consequence, materials treated with sprayable compositions of the present invention not only prevent damage due to fire, but also act to delay the spread of the flame, thus allowing the occupants of the building to escape, or to provide time enough to enable effective measures to be taken if the fire endangers individuals involved, especially children.

The fire retardant compositions of this invention are sprayable aerosol materials which may be classified as durable or nondurable. The durable compositions are solutions, emulsions or dispersions containing a pressure releasing agent and a fire retardant additive, the composition being characterized in that it will adhere to or remain in contact with the textile or cellulosic material treated despite adverse conditions such as laundering, tendencies toward leaching and the like. The nondurable compositions are also sprayable aerosol solutions, emulsions or dispersions formulated with a suitable pressure releasing agent, and a fire retardant additive making the material treated resistant to flame; but is subject to a lessening of this protection under some conditions of use, such as repeated laundering of textiles. Either the durable or nondurable compositions may contain in addition to the fire retardant additive, a so-called carrier; that is, a material intended to retain the fire retardant additive on the material treated. The carrier tends to make the treatment durable, but does not necessarily do so.

In general the sprayable, aerosol, fire retardant compositions of this invention are:

a. A freon-type solvent which is also a propellant in which is dissolved a fire retardant material such as an organic phosphate: or b. An aqueous emulsion or solution formed from freon-type solvent and a fire retardant material, the latter being the dispersed phase in the case of an emulsion; or c. A two-phase system, one phase being aqueous and the other being water immiscible. The aqueous phase may be a true solution or an emulsion containing the fire retardant material.

Solvents useful in formulating the present compositions are preferably adapted to act as the pressure releasing agent and also as solvents for the fire retardant additive and for the carrier, if a carrier is used. Usually such solvents are chlorofloro compounds having a moderately low boiling point which may be below room temperature or somewhat above room temperature. But in any event, it is such as to permit rapid expulsion of the solvent at normal room temperatures. In Table I a number of such solvents are set forth. A suitable solvent or mixture of such solvents can be used depending on the particular additive or carrier which is selected.

TABLE I

| Formula | Comments | B.P. °C. |
|---|---|---|
| $CHCl_2F$ | Freon 21 | 9 |
| $F_{CHClF}$ | Freon | −41 |
| $CHCl_2$—$CHF_2$ | | 60 |
| $CHCl_2$—$CClF_2$ | | 72 |
| $190 l_2$—$CHClF$ | | 102 |
| $CCl_3$—$CHClF$ | | 117 |
| $CCl_2F$—$CHCl_2$ | | 117 |
| $CHF_2$—$CCl_3$ | | 73 |
| $CHClF$—$CCl_2F$ | | 72 |
| $CHClF$—$CHF_2$ | | 28 |
| $CHF_2$—$CHF_2$ | | −23 |
| $CHF=CCl_2$ | | 37 |
| $CHCl=CHF$ | | 10 |
| $CCl_3F$ | Freon 11 | 24 |
| $CCl_2F_2$ | Freon 12 | −29 |
| $CCl_2F$—$CClF_2$ | Freon 113 | 46 |
| $CClF_2$—$CClF_2$ | Freon 114 | 4 |
| $CClF_2$—$CF_3$ | Freon 115 | −38 |
| $CH_3$—$CClF_2$ | Freon 142 | −10 |
| $CCl_2=CF_2$ | | 19 |

Table I—Continued

| | | |
|---|---|---|
| CClF=CF$_2$ | Kel-F Monomer | −28 |
| CF$_2$=CF$_2$ | Teflon Monomer | −78 |
| CH$_2$=CF$_2$ | | Below −70 |
| CH$_2$—CClF | | −25 |
| CH$_2$Cl—CF$_3$ | | 6 |
| CH$_2$Cl—CClF$_2$ | | 47 |
| CH$_2$Cl—CCl$_2$F | | 88 |

One type of fire retardant additive useful in connection with the present composition is brominated or chlorinated hydrocarbons which contain a phosphorus or nitrogen atom. Such additives are usually brominated or chlorinated phosphates or phosphites. They should be selected so as to have the desirable chemical characteristics depending upon their use in the particular solution, emulsion or dispersion which was formulated. Such additives include, for example, the following:

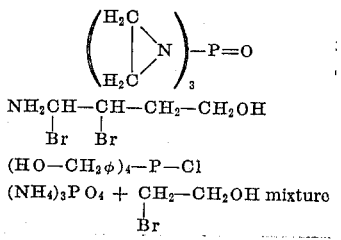

$$NH_2CH-CH-CH_2-CH_2OH$$
$$\quad\quad\;\;|\quad\;\;|$$
$$\quad\quad\;Br\;\;Br$$

$$(HO-CH_2\phi)_4-P-Cl$$

$$(NH_4)_3PO_4 + CH_2-CH_2OH \text{ mixture}$$
$$\quad\quad\quad\quad\quad\quad\quad\quad|$$
$$\quad\quad\quad\quad\quad\quad\quad\;Br$$

Tris dibromo ethyl phosphate
Tris (1-bromo-3-chloroisopropyl) phosphate
Tris (2,3-dibromopropyl) phosphate
Tris (trichloropropyl) phosphate
Tris (dichloroethyl) phosphate
Tris (1-bromo,4-chlorobutyl) phosphate If an aqueous emulsion is used to formulate the composition, a water soluble fire retardant additive may be used alone or, if desired, in addition to a second flame retardant additive or other additives; see Example IV hereinafter.

An ammonium, amide, or quaternary ammonium compound selected from the group consisting of bromides, chlorides and phosphates may be used for this purpose. Also, the corresponding phosphites may be used.

As pointed out above, in some compositions, the same compound may be used as a solvent and propellant. However, if a separate propellant is desired, it may be utilized. Thus, if a nonaqueous solution is prepared, the propellant can be a suitable pressure creating substance which is not soluble or is only slightly soluble in the solvent. For example, carbon dioxide, ethane, butane and other relatively inactive gases may be used under pressure to provide the propellant for the fire retardant additive phase of the composition.

It is also necessary or desirable in some compositions that a so-called carrier be utilized. The function of this carrier is to prevent loss of the fire retardant additive. This carrier thus makes it possible in some cases, for the fire retardant additive to be retained on the surface or in close association with the substance treated. In other cases it makes the composition durable when it would not be so otherwise. Such carriers are resinous materials or binders. Then should be selected to possess the chemical characteristics desirable to form a solution or emulsion with the solvents mentioned above in the presence of the fire retardant additive selected for use. Among the compounds particularly adapted for this purpose are latexes formed from polyvinyl chloride, polyvinyl acetate or polyvinyl alcohols. Also, acrylic polymers such as methyl methacrylate may be used as well as other readily polymerizable materials such as vinyl pyrrolidone which is known to polymerize at room temperatures without the use of a special catalyst, although, of course, heat or sunlight may assist in the polymerization.

The following examples are illustrative of the present invention and are not to be regarded as limitative It will be understood that all parts, percentages and proportions referred to herein are by weight unless otherwise indicated.

EXAMPLE I—Nondurable; Solution a. A vessel containing 10 parts of tris ("Technology," - dibromopropyl) phosphate was kept at 0° C. while freon 21 CHCl$_2$F) was condensed in the vessel. By the time 90 parts of freon 21 condensed, a clear light yellow fluid solution resulted. It was fluid at least within the range of −60° to 3° C. at atmospheric pressure, although this range may e extended considerably in a sealed vessel such as an aerosol bomb. A 10 gm. sample of the above solution was placed in a Fisher Porter glass compatibility tube. The "cold fill" technique described on pages 244–248 in "Aerosol-Science and Technology," H. R. Shepherd (Interscience Publishers, Inc., New York, N.Y., 1961) is used to add 40 gms. of a 1:1 mixture of trichloromonofluoromethane and dichlorodifluoromethane to provide a sprayable aerosol solution.

b. Instead of tris (2,3-dibromopropyl) phosphate, the same quantity of tris dibromoethyl phosphate may be used in the above composition.

c. Instead of tris (2,3-dibromopropyl) phosphate, the same quantity of tris dichloroethyl phosphate may be used in the above composition.

d. In either (b) of (c) above, an alkyl group other than the bromo or chloro ethyl group may be used (C$_2$–C$_6$) although the dihalogenated ethyl or butyl groups are preferred.

EXAMPLE II—Nondurable; Solution

Utilizing the procedure set forth in Example I, a composition was formulated using as the fire retardant material 10 parts of tris (1, bromo-3-chloropropyl) phosphate, or tris (1-bromo-4-chloro butyl) phosphate. Instead of freon 21, freon 11, 12 or 113 (See Table I) can be used, especially if a different boiling point is more suitable for the particular use for which the composition is intended.

In Examples I and II, the phosphite compound may be substituted for the corresponding phosphate or mixtures may be used, the same quantity of the fire retardant material being employed (same total quantity in the case of the mixture) and the same freons are recommended, although other suitable freons could be selected.

EXAMPLE III—Durable, Solution a. A vessel containing 10 parts of tris (2,3-dibromopropyl) phosphate and 2 parts of of polyvinyl acetate were kept at 0° C. while freon 21 (CHCl$_2$F) was condensed in the vessel. By the time 90 parts of freon 21 had condensed, a clear light yellow fluid solution resulted. It was fluid at least within the range of −60° C. to 3 ° C. at atmospheric pressure. A 10 gm. sample of the above solution was placed in a Fisher Porter glass compatibility tube. The "cold fill" technique referred to above (See Example 1) was used to add 40 gms. of a 1:1 mixture of trichloromonofluoromethane and dichlorodifluoromethane to provide a sprayable aerosol solution.

b. Instead of polyvinyl acetate, the same quantity; that is, 2 parts, of polyvinyl chloride or a mixture of polyvinyl acetate and polyvinyl chloride may be utilized in the above composition.

c. Instead of Tris (2,3-dibromophropyl) phosphate, the fire retardant materials of Example I, (b), (c) or (d) may be utilized in the above composition using polyvinyl acetate only as in III (a) or using the carriers of III (b).

D. Instead of the tris (2,3-dibromopropyl) phosphate, as the fire retardant material, those of Example II may be utilized in the composition of III (a) above utilizing polyvinyl acetate alone as the carrier or utilizing the carriers on III (c) or (d).

EXAMPLE IV—Durable; Emulsion a. An aqueous emulsion is prepared by adding 1 part "Cellosize" (hydroxy ethyl cellulose) to 60 parts of water under agitation. 8.1 parts of ammonium bromide is then added to the resulting emulsion followed by 3.2 parts by weight of tris (2,3-dibromopropyl) phosphate. The agitation should be vigorous enough to provide good dispersion at this point. To this emulsion, under continued agitation, 26 parts of "Geon" (a polyvinyl chloride latex) were added. A 10 gram sample of the above emulsion was placed in a Fisher Porter glass compatibility tube and the "cold fill" technique of Example I was followed using freon 21 as the propellant. The resulting aerosol mixture was a relatively stable homogeneous emulsion which separates into two phases on standing. Prior to use the homogeneous emulsion may be reformed by mild agitation after such separation.

b. Instead of the "Geon" of IV (a), 26 parts of a polyvinyl chloride polyvinyledene chloride latex was used or vinyl pyrollodone, methyl methacrylate or mixtures of latter two compounds may also be utilized in place of the "Geon" if desired.

EXAMPLE V—Durable: Two Phase a. To 10 parts of tris (2,3-dibromopropyl) phosphate was added an aqueous solution containing 10 parts of ammonium phosphate dissolved therein utilizing the "cold fill" technique of Example I. An appropriate freon-type solvent such as freon 21 was added in a closed vessel. The 10 parts of tris (2,3-dibromopropyl) phosphate dissolved in the freon providing an organic phase consisting of this freon solution and an aqueous phase containing the ammonium phosphate.

b. Instead of tris (2,3-dibromopropanol) phosphate, 10 parts of tris (1-bromo-3-chloropropyl) phosphate could be utilized or 10 parts of the chloro compounds of Example I (c) could be substituted therefor.

c. Instead of the freon compound of (a) above, the propellant may be an inert gas which is compatible with the aqueous phase but which is not soluble in, or miscible with the organic phase. For instance, $CO_2$ under pressure could be utilized.

In order to modify the foregoing solutions or emulsions for cosmetic purposes, small amounts of other ingredients may be added such as an emollient oil, perfume, a bactericide, or an agent to reduce tackiness if desired, such as the inter polymer of methyl vinyl ether and monobutyl maleate. In some cases, a small amount of a solvent for such additives may be necessary in order to incorporate them into the composition, such for instances as ethyl alcohol. It will be understood that such solvents are added at concentrations below that which would create a fire hazard.

For practical use, the compositions of the present invention are packaged in a self-dispensing container of an appropriate size equipped with a valve mechanism. These compositions are maintained under pressure in such containers and are dispensed by operation of of the valve mechanism to provide a spray which may be directed by the user to the surface of the material to be treated. Such containers and valve equipment are well known in the aerosol industry and, as such, do not form a part of the present invention. Various consumer products are packaged and dispensed in this way, such as hair spray, shaving lather, etc.

If a two phase system is used, however, it is recommended that the container include a dip tube leading from the valve mechanism to the bottom portion of the container. Thus operation of the valve mechanism will first dispense the phase at the bottom of the container. If desired, the propellant which forms the phase in the upper portion of the container need not be used since very little of it will escape with the phase first dispensed. Of course, the propellant may contain a fire retardant material and be dispensed after the first phase to assist in rendering the treated material as fire resistant or flame retardant as possible. However, if a gas under pressure is used as the propellant, is is usually desirable not to dispense the gas. Consequently, in this case the container with the gas in it may be disposed of when the dispensed phase has been used up.

This invention has been disclosed with respect to certain preferred embodiments. Various modifications and variations thereof will become obvious to persons skilled in the art, and it is to be understood that such modifications and variations are to be included within the spirit and scope of the invention.

What is claimed is:

1. A flame retardant sprayable aerosol composition adapted when retained in a valved container to be pressurized and self-dispensing, which comprises a fire retardant material operably associated with a normally liquid propellent consisting essentially of at least one aliphatic chlorofluoro hydrocarbon having 1 to 2 carbon atoms, said fire retardant material consisting essentially of
   a. an ammonium amide or quaternary ammonium compound selected from the group consisting of bromides, chlorides and phosphates, or
   b. a brominated or chlorinated aliphatic phosphate or phosphite having 2 to 6 carbon atoms in each of its carbon chains, or
   c. mixtures thereof, whereby said composition is adapted when dispensed to impart fire retardant characteristics to a treated material.

2. A fire retardant sprayable aerosol composition according to claim 1 in which the fire retardant material consists essentially of a brominated or chlorinated aliphatic phosphate or phosphite having 2 to 6 carbon atoms in each of its carbon to carbon chains.

3. A flame retardant aerosol composition according to claim 1 in which the fire retardant material is dissolved in the propellent.

4. A flame retardant sprayable aerosol composition according to claim 1 which also contains a carrier selected from the group consisting of polyvinyl acetate, polyvinyl chloride, polyvinyl alcohols, acrylic polymers and vinyl pyrrolidone polymers.

5. A flame retardant sprayable aerosol composition according to claim 1 in which the fire retardant material is tris (2,3-dibromopropyl) phosphate which is dissolved in the propellent.

6. A flame retardant sprayable aerosol composition according to claim 1 in which the fire retardant material is tris (2,3-dibromopropyl) phosphate and the propellent is dichloromonofluoromethane.

7. A flame retardant sprayable aerosol composition according to claim 1 in which the fire retardant material is tris (2,3-dibromopropyl) phosphate, which contains a carrier consisting essentially of polyvinyl acetate, and in which the propellent and common solvent for said fire retardant material and carrier consists essentially of a mixture of trichloromonofluoromethane and dichlorodifluoromethane.

8. A flame retardant sprayable aerosol composition according to claim 1 which contains an aqueous emulsion of the fire retardant material in addition to the propellant.

9. A flame retardant sprayable aerosol composition adapted when retained in a valved container to be pressurized and self-dispensing, which consists essentially of an aqueous emulsion having dissolved as a fire retardant material in its aqueous vehicle a member of the group consisting of an ammonium, amide, or quaternary ammonium compound selected from the group consisting of bromides, chlorides and phosphates, and having dispersed in said aqueous vehicle a brominated or chlorinated aliphatic phosphate or phosphite having 2–6 carbon atoms in each of its carbon to carbon chains; and as a propellent at least one aliphatic chlorofluoro hydrocarbon having 1 to 2 carbon atoms.

10. A flame retardant sprayable aerosol composition adapted when retained in a valved container to be pressurized and self-dispensing, which consists essentially of an aqueous emulsion having dissolved as a fire retardant material in its aqueous vehicle a member of the group consisting of an ammonium amide, or quaternary ammonium compound selected from the group consisting of bromides, chlorides and phosphates, and having dispersed in said aqueous vehicle, a brominated or chlorinated aliphatic phosphate or phosphite having 2–6 carbon atoms in each of its carbon to carbon chains; a carrier selected from the group consisting of polyvinyl acetate, polyvinyl chloride, polyvinyl alcohols, acrylic polymers, and vinyl pyrrolidone polymers; and as a propellent at least one aliphatic chlorofluoro hydrocarbon having 1 to 2 carbon atoms.